UNITED STATES PATENT OFFICE.

GUIDO KUSTEL, OF SAN FRANCISCO, CALIFORNIA.

Letters Patent No. 84,497, dated December 1, 1868.

IMPROVED MODE OF WORKING GOLD AND SILVER ORES.

The Schedule referred to in these Letters Patent and making part of the same.

*To all whom it may concern:*

Be it known that I, GUIDO KUSTEL, of the city and county of San Francisco, State of California, have invented an Improved Process for Working Gold and Silver Ores, containing base metals; and I do hereby declare that the ingredients used, together with the manner of proceeding, and the best apparatus known to me for performing said process, are fully described in the following specification.

This process refers only to such ores as require to be roasted before amalgamation in iron-amalgamating pans, tubs, or barrels.

The difficulty of obtaining a clean amalgam of the ore in question after chloridizing-roasting, lies in the formation of chlorides of base metals, nearly all of which are decomposed and amalgamated. In many instances, also, the iron from stamps and grinders enters the amalgam, rendering the retorted amalgam infusible. Ores and tailings, showing the last-mentioned peculiarity, were heretofore entirely intractable in pans, under the usual mode of amalgamation.

The presence of base-metal chlorides in the roasted ore is not only obstructive to their readiness to amalgamate, reducing thereby the value of the bullion, but they also prevent a perfect amalgamation of the chloride of silver, causing, at the same time, a great loss of quicksilver. The speedy destruction of the iron-pan amalgamators is due principally to the base-metal chlorides.

All these mentioned disadvantages I obviate by a simple process of separating the chloride of copper and iron; and, to a great extent, the chlorides of antimony, lead, and zinc, from the roasted ore before amalgamation, in the following manner:

Close to each pan, a wooden box is placed, large enough to receive one charge of ore. A large vat or box, capable of receiving from five to ten tons at a time, may be used, if desired, in place of the smaller boxes, according to circumstances. In each case, there is a false bottom attached, provided with a cock. After the ore has been charged, hot water, about two times the bulk of the ore, containing one-half pound of sulphuric acid to a charge of one thousand pounds of ore, is conveyed into the box, so that the ore is completely immersed. The cock is then opened, and so much of the water continually admitted as to keep the ore covered by it.

When the sour water is consumed, cold water is admitted into the box, and allowed to pass through until all the soluble chlorides are carried out. To ascertain this, a glassful of the liquid is taken at intervals, and a few drops of sulphide of sodium added. If the liquid remains clear, the leaching is finished, and the ore ready for amalgamation. The examination of the liquid is necessary only in the beginning. Experience will teach how much water for the same kind of ore is required to purify a charge. The charge will always be finished before the preceding amalgamation in the pan is ready.

No sulphuric acid is used, if a great deal of antimony and lead is present.

The advantages claimed by preparing the roasted ore for amalgamation by this method are as follows:

First, the yield of silver is increased from ten to twenty per cent.;

Second, the fineness of bullion is from .800 to .900;

Third, the quicksilver loss is diminished to fifty per cent.;

Fourth, the durability of the pan is increased from four to five fold;

Fifth, the time required for an amalgamation is shortened; and

Sixth, no iron enters the amalgam.

Having thus described my invention,

What I claim, and desire to secure by Letters Patent, is—

The ingredients or agents above enumerated, added to the ores, in the manner and in about the proportions herein specified, for the purpose set forth.

In witness whereof, I have hereunto set my hand and seal.

GUIDO KUSTEL [L. S.]

Witnesses:
N. PRIEPOR,
OTTOKAR HOFMANN.